United States Patent
Gustafsson

(12) 
(10) Patent No.: US 6,475,381 B1
(45) Date of Patent: Nov. 5, 2002

(54) DEVICE OF THREE-CHAMBER TYPE FOR PURIFYING LIQUID

(76) Inventor: Bert Gustafsson, Kyrkogatan 8 B, S-371, 32 Karlskrona (SE)

( * ) Notice: Subject to any disclaimer, the term of this patent is extended or adjusted under 35 U.S.C. 154(b) by 0 days.

(21) Appl. No.: 09/744,019

(22) PCT Filed: Jul. 19, 1999

(86) PCT No.: PCT/SE99/01289

§ 371 (c)(1),
(2), (4) Date: Feb. 21, 2001

(87) PCT Pub. No.: WO00/04972

PCT Pub. Date: Feb. 3, 2000

(30) Foreign Application Priority Data

Jul. 20, 1998 (SE) .............................................. 9802593

(51) Int. Cl.[7] ............................. B01D 21/02; C02F 3/06
(52) U.S. Cl. .................... 210/151; 210/195.1; 210/196; 210/519; 210/532.1; 210/532.2; 210/521
(58) Field of Search ................................ 210/150, 151, 210/195.1, 196, 256, 519, 521, 532.1, 532.2

(56) References Cited

U.S. PATENT DOCUMENTS

| | | | | |
|---|---|---|---|---|
| 948,924 | A | * 2/1910 | Goedecker | 210/532.1 |
| 1,641,469 | A | * 9/1927 | Baker | 210/532.2 |
| 3,412,864 | A | * 11/1968 | Okada | 210/151 |
| 3,817,864 | A | * 6/1974 | Carlson et al. | 210/532.2 |
| 5,156,742 | A | * 10/1992 | Struewing | 210/151 |
| 5,498,331 | A | * 3/1996 | Monteith | 210/521 |
| 5,609,754 | A | * 3/1997 | Stuth | 210/151 |
| 5,725,760 | A | * 3/1998 | Monteith | 210/521 |
| 5,753,115 | A | * 5/1998 | Monteith | 210/521 |
| 5,800,715 | A | * 9/1998 | Batson | 210/532.1 |

FOREIGN PATENT DOCUMENTS

| | | | |
|---|---|---|---|
| CH | 622708 | * | 4/1981 |
| EP | 378288 | * | 7/1990 |
| FR | 2386651 | * | 4/1977 |
| JP | 9-273210 | * | 4/1996 |

* cited by examiner

Primary Examiner—Christopher Upton
(74) Attorney, Agent, or Firm—Breiner & Breiner, L.L.C.

(57) ABSTRACT

A device of three-chamber type for purifying liquid in a cup-shaped vessel (17, 18) has an inlet tube (20) for the liquid at a certain level and an outlet tube (21) at a lower level than the inlet tube. The vessel is vertically divided by a substantially horizontal distribution disc (14) below the inlet and outlet tubes. The disc has at least one opening (19) and is provided with a substantially vertical distribution pipe (15) for receiving the liquid from the inlet tube (20). A first sedimentation chamber (A) is formed below the lower end of the distribution pipe (15), a second chamber (B) is formed over the lower end of the distribution pipe (15) and below the distribution disc (14) and a third chamber (C) is formed over the distribution disc (14).

10 Claims, 5 Drawing Sheets

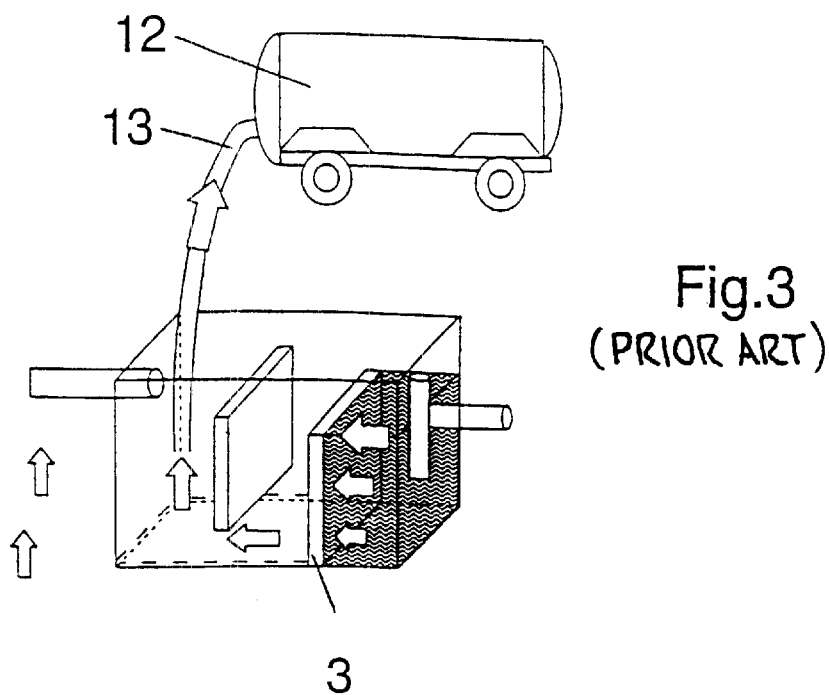
Fig. 3
(PRIOR ART)
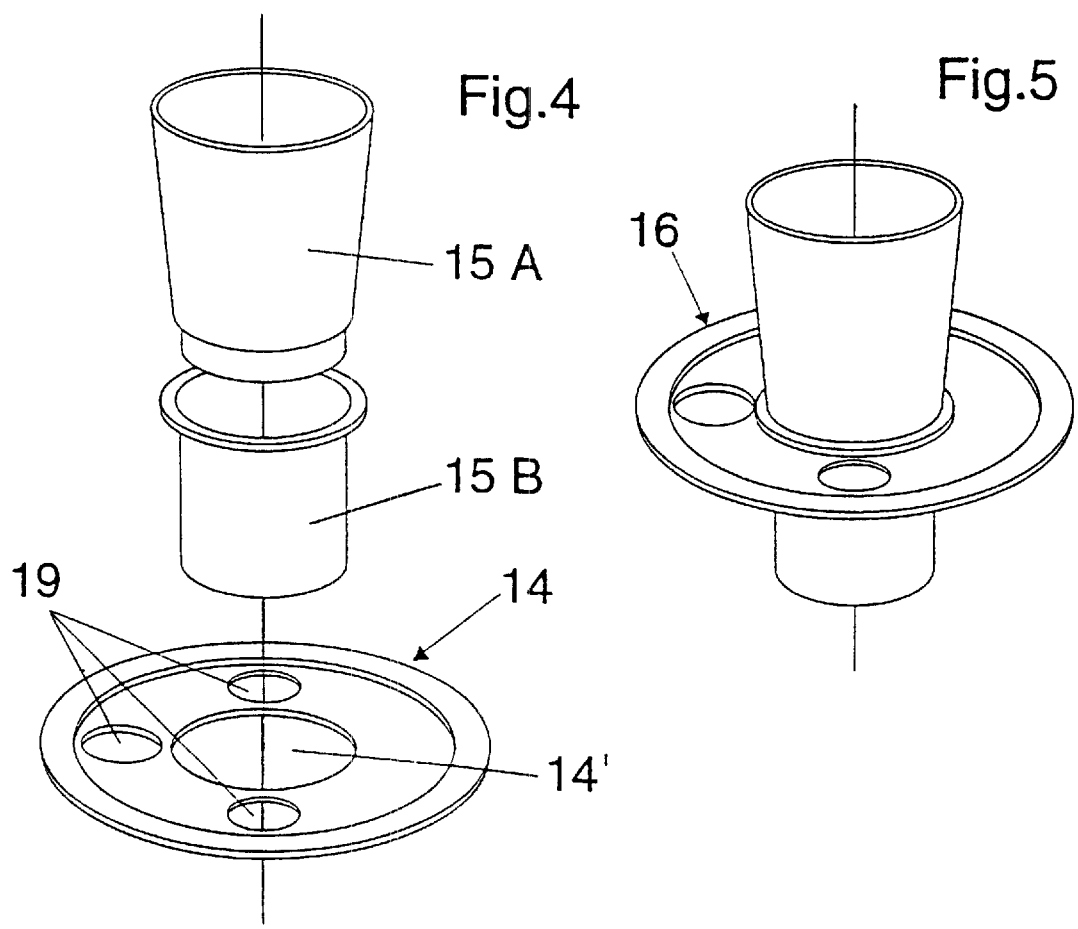
Fig. 4
Fig. 5

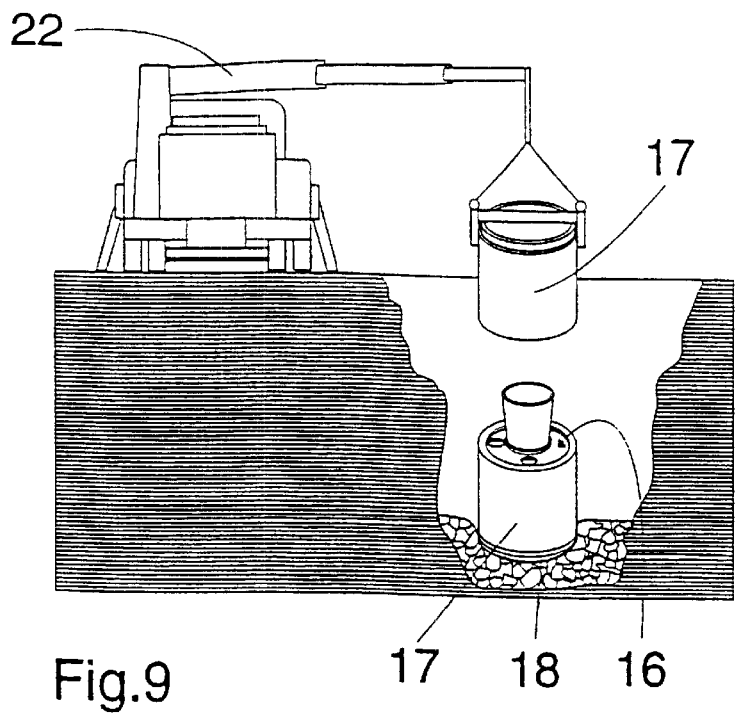
Fig.9
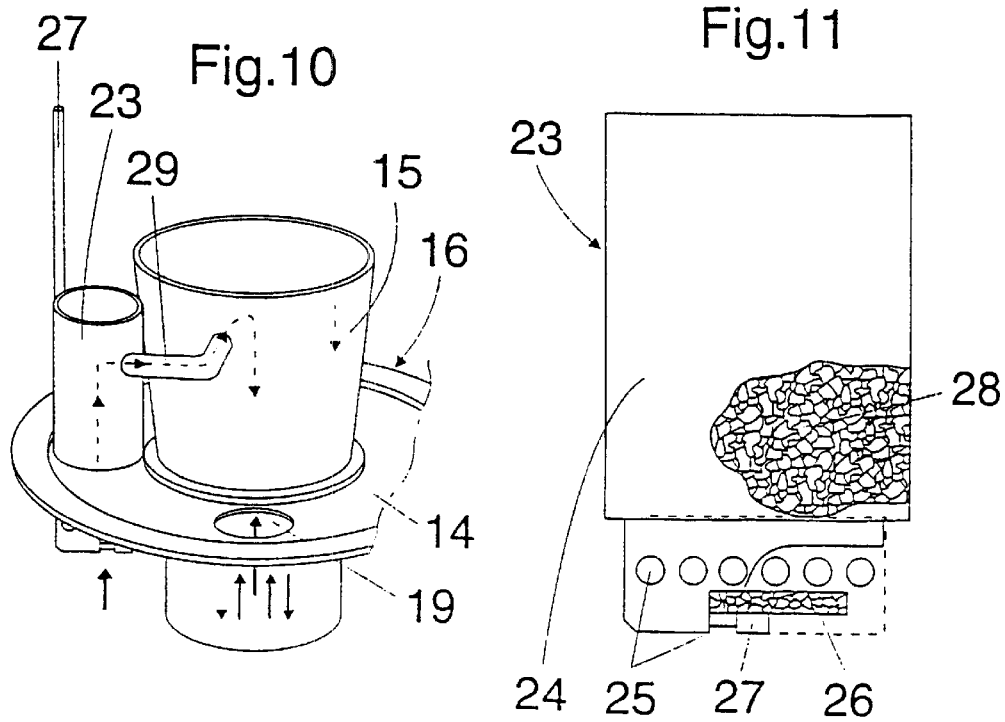
Fig.10
Fig.11

DEVICE OF THREE-CHAMBER TYPE FOR PURIFYING LIQUID

TECHNICAL FIELD

The present invention relates to a device of three-chamber type for purifying liquid in a cup-shaped vessel having an inlet tube for the liquid at a certain level and an outlet tube at a lower level than the inlet tube.

BACKGROUND OF THE INVENTION

In the field of water purification—both with regard to pretreatment and to aftertreatment—the separation and storing of sinking and floating contaminants and particles is of great importance. This separation and sedimentation is accomplished in that the water is forced to flow through several chambers, where the dimensioning of each chamber is determined with regard to the sinking speeds of the contaminants and particles to separate.

A sludge separator, a septic tank of three-chamber type, or a fat separator thus consists of a container, which is divided into several chambers by vertical partition walls allowing the water or liquid to flow from chamber to chamber through openings in the walls at appropriate levels depending on the density of the contaminants or particles to separate.

These partition walls may be subjected to great pressures at sludge removal or emptying, as the liquid level may be much higher at one side of a partition wall than on the other one, which means that the partition walls must be dimensioned and attached with this difficulty in mind.

Undesired leakage may appear along the attachments of the partition walls. The partition walls of concrete are conventionally arranged in vessels of concrete, for example well rings or well pipes. For solving the above problems the partition walls have themselves to be reinforced and have to be attached by separate reinforcement bars and sealed.

This means that the conventional devices of the kind described are heavy, less volume effective, and rather expensive, although the comparatively cheap material concrete is used.

THE INVENTION

The above and other problems with a device of the kind defined above is according to the invention solved in that the vessel below the inlet and outlet tubes is vertically divided by a substantially horizontal distribution disc having at least one opening and being provided with a substantially vertical distribution tube for receiving the liquid from the inlet tube.

Hereby, a first chamber is formed below the lower end of the distribution tube, a second chamber is formed over the lower end of the distribution tube and below the distribution disc, and a third chamber is formed over the distribution disc.

In a design of this type, a sewage treatment or purification plant of biological type may be attained in that a reactor containing water purification bacteria, preferably on a carrier material, such as zeolite, and having in its lower end an air nozzle for oxygenating liquid admitted at this lower end is arranged in an opening in the distribution disc having at least one further opening. A reactor conduit connects the upper part of the reactor with the distribution tube, so that a recirculation of the liquid is accomplished.

BRIEF DESCRIPTION OF THE DRAWINGS

The invention will be described in further detail below under reference to the accompanying drawings, in which FIG. 3 is an illustration of the emptying of the septic tank of FIG. 1, FIG. 4 is a perspective view of three members forming an insert for a septic tank according to the invention, FIG. 5 is a perspective view of a completed insert, FIG. 9 is an illustration of the installation of a septic tank according to the invention, FIG. 10 illustrates a modification of the insert according to the invention to order to accomplish a small sewage treatment or purification plant, FIG. 11 is a partly sectional view of the main member added to the insert for accomplishing the construction shown in FIG. 10.

DETAILED DESCRIPTION OF PREFERRED EMBODIMENTS

Figure 1:
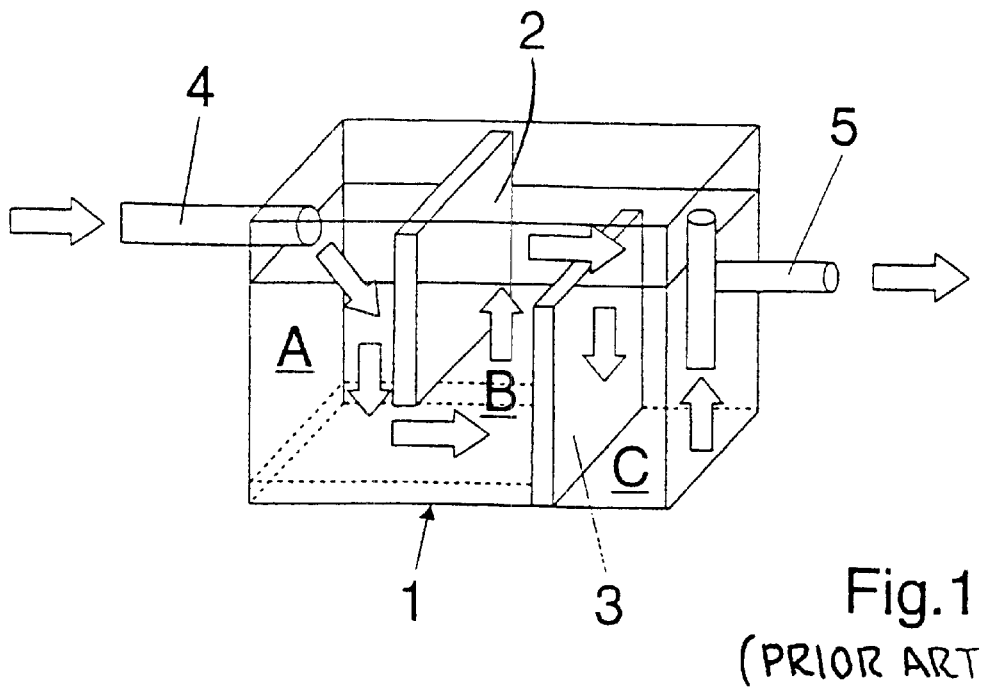
FIG. 1 is a schematic illustration of a conventional septic tank of an ordinary three-chamber type.

FIG. 1 is a schematic illustration of a conventional septic tank of a traditional three-chamber type. Such a septic tank is primarily used for separation and storage of sinking and floating contaminants and particles of wastewater or sewage, for example from households not connected to public wastewater systems.

In a parallelepipedical tank or vessel 1, for example made of concrete, there are two vertical partition walls 2 and 3 extending all the way between two side-walls of the vessel. The first wall 2 does not extend all the way down to the bottom of the vessel, whereas the second wall 3 extends from the bottom to a certain height in the vessel.

The sewage introduced through an inlet tube 4 to the left in FIG. 1 will be forced by the partition walls 2 and 3 to follow a winding path through the vessel, as indicated by arrows in FIG. 1, before the purified liquid leaves the vessel through an outlet tube 5. This winding path is under the first wall 2 and over the second wall 3. The outlet tube 5 starts at a lower level than the top of the second wall 3. Three chambers are formed in the vessel 1: a first chamber A to the left of the first partition wall 2 in FIG. 1, a second chamber B between the two walls 2 and 3, and a third chamber C to the right of the second wall 3. (The three chambers will be called A, B and C throughout this specification.)

Sludge contained in the wastewater admitted through the inlet tube 4 will be deposited in chambers A and B. Floating sludge will remain on the water surface in chamber A. Sinking sludge will settle as sediment on the bottom of chambers A and B, as indicated in FIG. 1. The water leaving chamber B over the edge of wall 3 will be substantially clean, but the final sedimentation occurs in chamber C.

The volumes of the chambers A, B and C and the size of the flow channels between the chambers are chosen in dependence of the wastewater volume as well as the density and sinking speed of the contaminants and particles in the wastewater.

Figure 2:
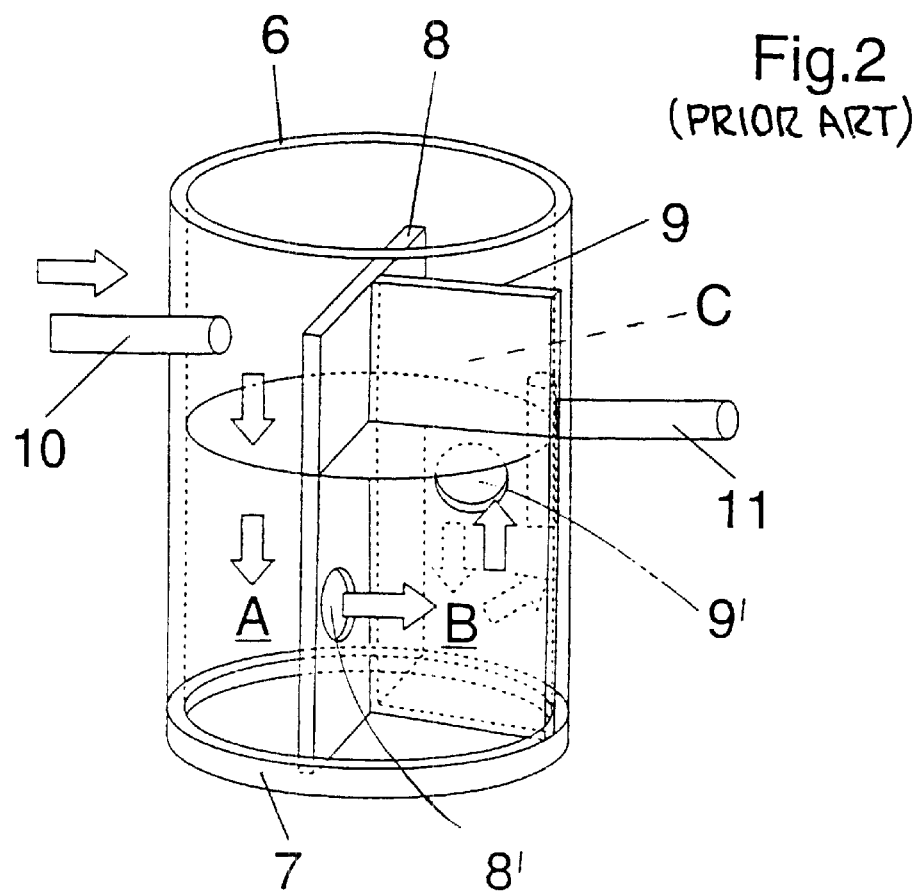
FIG. 2 is a corresponding illustration of a practical embodiment of such a septic tank.

A commonly used practical embodiment of a septic tank of the same principal kind as the one shown in FIG. 1 is shown in FIG. 2. Here, the vessel is in the form a circular pipe 6, often manufactured of concrete, with a bottom 7. The pipe 6 is internally provided with two partition walls 8 and 9, preferably also made of concrete and sealingly attached to the pipe as well as each other. The partition wall 8 is provided with one or more holes 8' at a lower level and the partition wall 9 with one or more holes 9' at a higher level, so that three chambers A, B and C with the same function as the three corresponding chambers in the embodiment of FIG. 1 are formed. There is an inlet tube 10 to the first chamber A and an outlet tube 11 from the third chamber C.

The removal of sludge from a septic tank as shown in FIG. 1 is illustrated in FIG. 3; the same principles apply to the embodiment of FIG. 2. At the removal of sludge, normally by means of a vacuum vehicle 12 with a suction hose 13, chambers A and B are emtied from water with its sludge, whereas chamber C is still filled with water. This means that the full water pressure is applied on the second partition wall 3, which has to be dimensioned and attached with this pressure in mind. Also the sealing aspect has to be taken into account.

This means that the partition walls of septic tanks of concrete have to be reinforced and that separate reinforcement bars in separate bores have to be provided for the attachment of the walls in the vessel or pipe. This greatly adds to the weight of the septic tank as well as the costs for its manufacture.

A septic tank of the same kind may according to the invention be constructed in a completely different way, as will now be described with reference to FIGS. 4–8.

Figure 6:
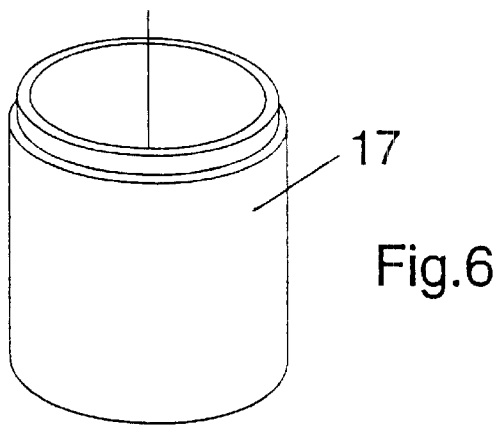
FIG. 6 illustrates the combination of the insert of FIG. 5 with pipe members to form a septic tank.

Three members shown in FIG. 4 may form an insert, shown assembled in FIG. 5. The assembled insert may be mounted together with two well rings or well pipes and a bottom for together forming a septic tank, as is illustrated in FIG. 6.

As is shown in FIG. 4, a distribution disc 14 has a substantially central hole 14'. Two distribution tubes 15A and 15B are intended to be attached to the disc 14 and its hole 14' from above and from below, respectively, for forming a permanent distribution insert 16, FIG. 5. The disc 14 is preferably made of corrosion resistant plate, whereas the distribution tubes 15A,B can be made of plastic. These tubes are shown as slightly conical, which has to do with their manufacture.

The insert 16 may be arranged with its disc rim between two concrete well rings or well pipes 17, which supplemented with a bottom 18 constitute a septic tank according to the invention.

The distribution disc 14 is provided with at least one but often several openings 19, preferably arranged at one side of the disc 14 (diametrically opposed to an outlet tube 21 to be described). The distribution insert 16 thus has one flow passage through the distribution tubes 15A and 15B, together forming one distribution tube 15, and another flow passage through the opening(s) 19.

When the insert 16 is mounted in an outer vessel, for example the two well rings or well pipes 17 and the bottom 18, as is indicated in FIG. 6, and supplemented with an inlet tube 20 to the upper part of the distribution tube 15 and an outlet tube 21 from the vessel 17 at a level under the inlet tube 20, a septic tank with a function corresponding to that of the septic tanks of FIGS. 1 and 2 is formed.

Figure 8:
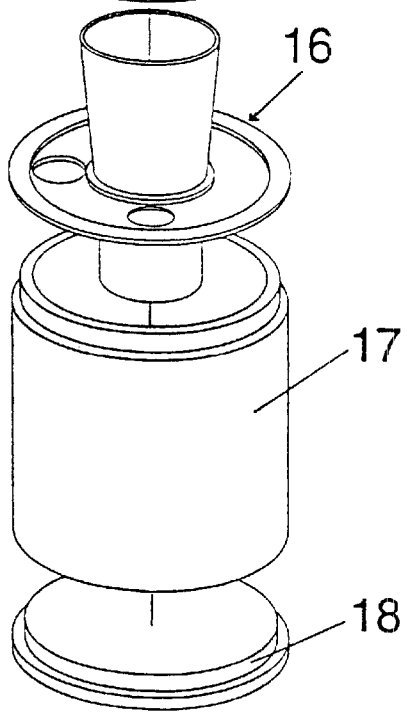
FIG. 8 is a top view corresponding to FIG. 7.
Figure 8:
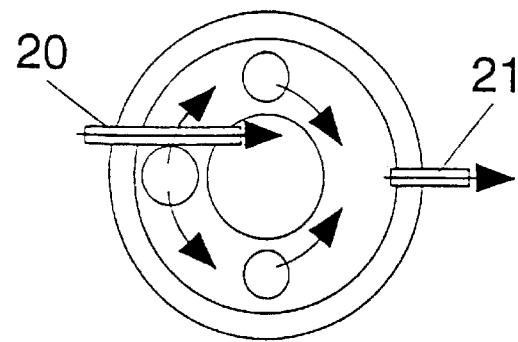
Figure 7:
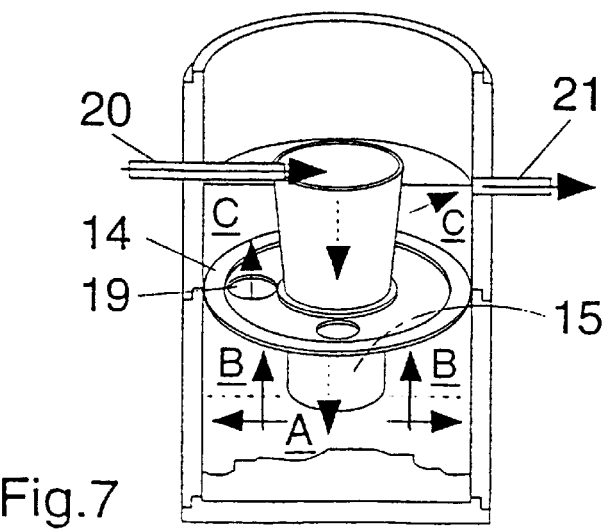
FIG. 7 is a schematic illustration of a septic tank according to the invention with its function indicated.

The fluid flow in the septic tank of FIGS. 7 and 8 is as follows and as indicated by the arrows therein. After entering through the inlet tube 20 the wastewater will flow down through the distribution tube 15 towards the bottom of the tank, where sludge is collected. The water will flow upwards through the opening(s) 19 in the distribution disc 14 and then (around the distribution tube 15) to the outlet tube 21.

Three chambers corresponding to the three chambers in the previously described septic tanks will hereby be formed: a first chamber A in the distribution tube 15 and in the vessel 17, 18 up to the level of the lower end of the distribution tube 15, a second chamber B in the vessel from this level up to the distribution disc 14, and a third chamber C above the distribution disc 14.

The size of the openings 19, which do not have to be circular, is determined by the desired flow through the septic tank. The volume of the respective chambers can be determined by the length and diameter of the distribution tube 15, the diameter of the vessel 17, and by the position of the distribution insert 16 in the vessel 17.

The sludge, which is collected at the top of the distribution tube 15—as floating contaminants or particles—and on the bottom 18, is removed through the distribution tube 15. At such removal by suction the water from the third chamber C flows back through the opening(s) 19, when the water level in the first chamber A is lowered. This means that no one-sided pressure is exerted on any internal wall or in other words that all drawbacks with the previously known septic tanks of the kind described are removed.

FIG. 9 clearly illustrates the ease with which a septic tank according to the invention may be installed in a pre-excavated hole in the ground. By means of for example a mobile crane 22, front-loader or the like a first well pipe 17 with a bottom 18 is placed on the bottom of the hole. Thereafter or concurrently therewith the completed distribution insert 16 is placed with its rim on the first well pipe. Finally, a second pipe 17 (shown hanging in the crane) is placed on the rim of the distribution insert 16 and the first well pipe 17 without any need for precision with regard to relative rotational positions.

This compares favourably with the situation where a traditional septic tank of the kind shown in FIG. 2, which is normally divided into two pipe parts, shall be mounted, often by a heavy-duty crane due to the large weights involved. Due to the presence of the partition walls 8 and 9, a great precision is needed with regard to the relative rotational positions. Further, the partition walls have to be joined and sealed, which may be an awkward task.

By the fact that the conventional partition walls 8 and 9 of concrete are dispensed with in the septic tank according to the invention the total volume with unchanged capacity can decrease by about 10%, which may mean a reduction of the total weight of 15–20%.

The reason for this great volume and weight reduction is mainly that a partition wall of reinforced concrete normally must have a thickness of 80–150 mm depending on the size of the septic tank. The weight of concrete partion walls for a normal septic tank with a diameter of 2.5 m and a water depth of 3 m may amount to about 3 tons.

By making use of the design according to the invention the weight reduction may thus amount to 3 tons, whereas the volume gain may be 1.3 m$^3$. This can be used to decrease the total height of the construction with some 0.3 m, leading to a further weight reduction of more than 1 ton. Thus, the total weight reduction may be in the order of 4 tons with retained capacity.

In the present case, the total weight may be reduced from about 20 tons to about 16 tons, i e some 20%.

Figure 12:
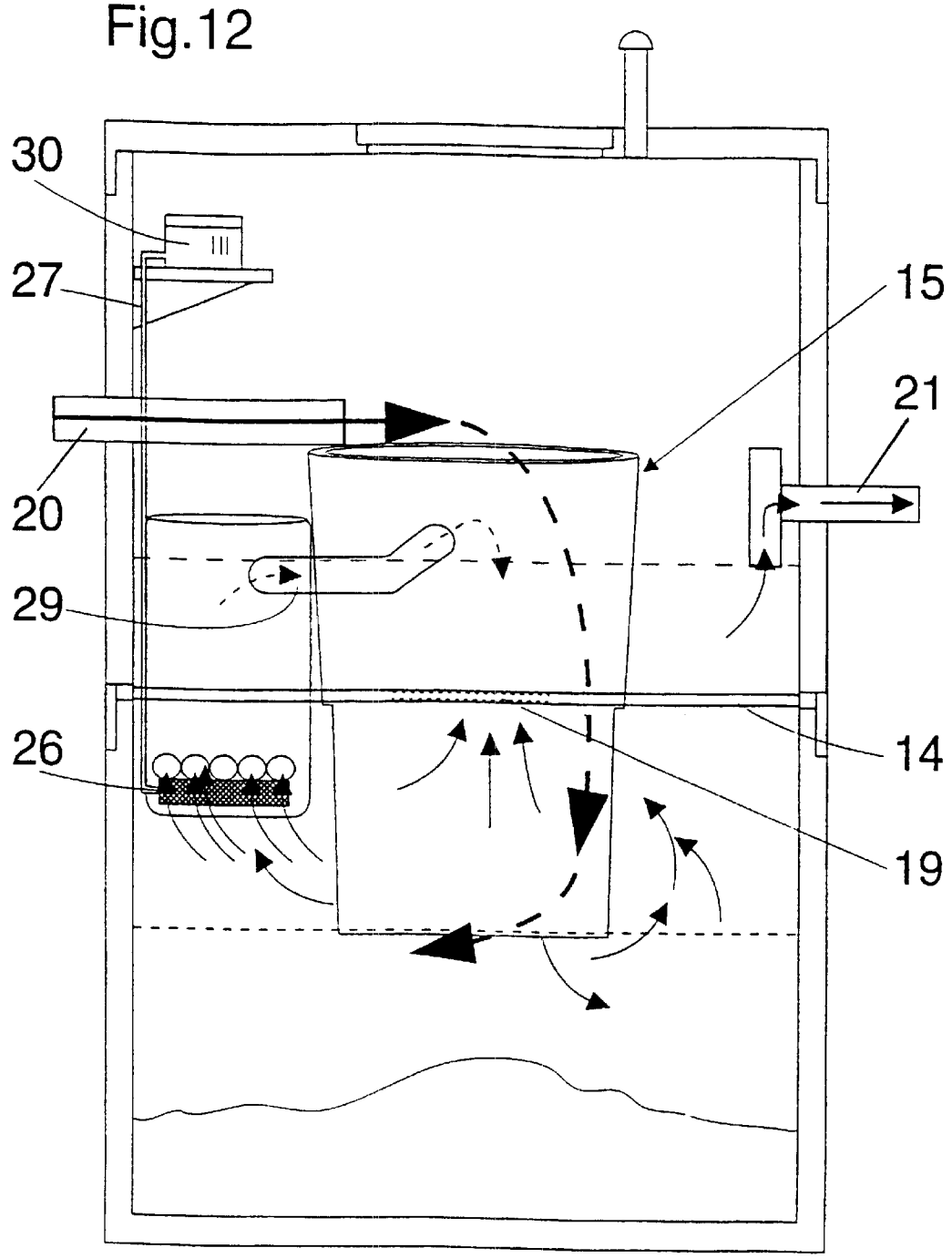
FIG. 12 is a cross-sectional view of a small sewage treatment plant containing the members shown in FIGS. 10 and 11.

The basic idea of the invention may also be used for creating a sewage treatment or purification plant as shown in FIGS. 10–12.

FIG. 10 shows a distribution insert 16 of the type shown for example in FIG. 5 but supplemented with a reactor 23 as shown in FIG. 11. This reactor 23 is positioned in one of the openings 19 in the distribution disc 14.

Referring to FIG. 11, the reactor 23 has a preferably cylindrical housing 24. The lower part of the housing 24 has a somewhat reduced diameter corresponding to the diameter of the distribution disc opening, so that it extends below the disc 14 (into chamber B). The housing 24 here has a number of inlet openings 25 for sewage water. In the lower part of the housing 24 there is an air nozzle 26. Air is provided to the nozzle 26 through a conduit 27. The purpose of the air nozzle 26 is to oxygenate the passing liquid, before it continues to the upper part.

The upper main part of the reactor housing 24 contains a suitable carrier material 28 for bacteria active in purification in sewage treatment plants. These bacteria will form a layer or film on the carrier material 28, which may be crushed zeolite or the like.

As appears in FIG. 10 (as well as in FIG. 12), the reactor 23 when mounted to the distribution insert 16 is connected at its upper part to the distribution pipe 15 by means of a reactor conduit 29.

The design is completed by an air pump 30 connected to the air nozzle 27, as is shown in FIG. 12.

The function of the described sewage treatment plant will be described with reference to FIG. 12. Sewage or wastewater is supplied to the distribution tube 15 through the inlet tube 20. Sludge will be deposited on the bottom of the plant. By the pumping action of the air nozzle 26, liquid will continuously be circulated through the reactor 23 and the conduit 29 and again to the distribution pipe 15. Purification of the liquid will occur in the reactor 23. When new sewage is supplied, purified water leaves chamber B under the distribution disc 14 through the opening(s) 19 and leaves the plant through the outlet tube 21.

The reactor 23 with its content of bacteria will function as an efficient bioreactor for the oxygenated liquid pumped through it. A good biological reduction of BOD, COD, proteins, etc is obtained. Also conditions for a good nitrification and thus a high biological reduction of nitrogen have been created.

Other designs resembling the one shown in FIGS. 10–12 for accomplishing a sewage treatment plant with a reactor 23 in one of the distribution disc openings 19 and with a recirculation of the liquid are conceivable, but the shown and described one is presently preferred.

The advantages of the invention may be summarized as follows:

By using the invention in a concrete construction, a weight reduction of some 20% is obtained, as well as a volume reduction of some 10%.

The production cost is reduced with respect to material, machine hours, and man hours.

The installation is simplified, as the problems with joining and sealing partition walls are eliminated. Also, the reduced weight enables the use of a less sophisticated crane.

The problem with remaining water and sludge in any chamber at sludge removal is eliminated.

The sludge removal is simpler and faster, as only one chamber is involved.

The storage economy is improved, as there is no longer any reason to store special well rings with fixed or moulded partition walls.

Reference has above primarily been made to the construction of a septic tank or a sewage purification plant consisting of an inventive distribution insert in a concrete vessel, built up of well rings or the like and of a concrete bottom. However this vessel may equally well be constructed of another material, such as plastic.

What is claimed is:

1. A liquid purifying device comprising:

a cup-shaped vessel, an inlet leading into the vessel at a first level, an outlet leading out of the vessel at a second level below the first level, a substantially horizontal distribution disc having an upper face and a lower face and at least one opening therethrough, the distribution disc being positioned within the vessel at a third level which is below the second level, and a substantially vertical distribution tube extending above the upper face and below the lower face of the distribution disc for receiving a liquid from the inlet.

2. The device according to claim 1 wherein the at least one opening is spaced from the outlet.

3. The device according to claim 2 wherein the at least one opening is substantially diametrically opposed to the outlet.

4. The device according to claim 1 wherein a plurality of the at least one opening are present and said plurality are each spaced from the outlet.

5. The device according to claim 1 wherein the distribution tube is constructed and arranged to receive a vacuum means to remove sludge from the vessel.

6. The device according to claim 1 wherein the distribution tube comprises two parts with each part being attached to an opposite side of a central opening in the distribution disc.

7. The device according to claim 1 wherein said vessel comprises two well pipes and a bottom wall; and the distribution disc further comprises a rim positioned between said two well pipes.

8. The device according to claim 1, 2, 3, 4, 5, 6 or 7 further comprising a reactor containing water purifying bacteria and having in a lower end of the reactor an air nozzle for oxygenating liquid admitted into the lower end, wherein the reactor is positioned in one of said at least one opening and at least two of said at least one opening are present in the distribution disc.

9. The device according to claim 8 wherein the reactor further comprises an air pump for delivering air to the nozzle.

10. The device according to claim 8 wherein the reactor further comprises a reactor conduit which connects the reactor to the distribution tube.

* * * * *